July 4, 1950    F. FAHLAND    2,514,229
SUPPORTING CROSSBAR FOR VEHICLES
Original Filed April 23, 1945
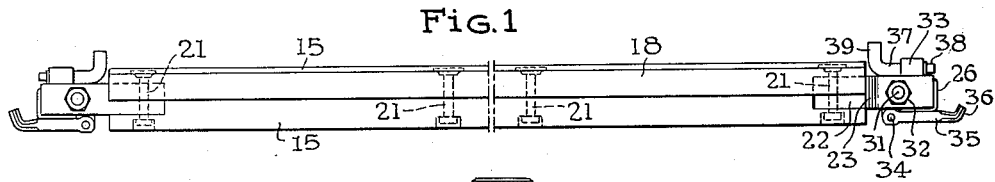
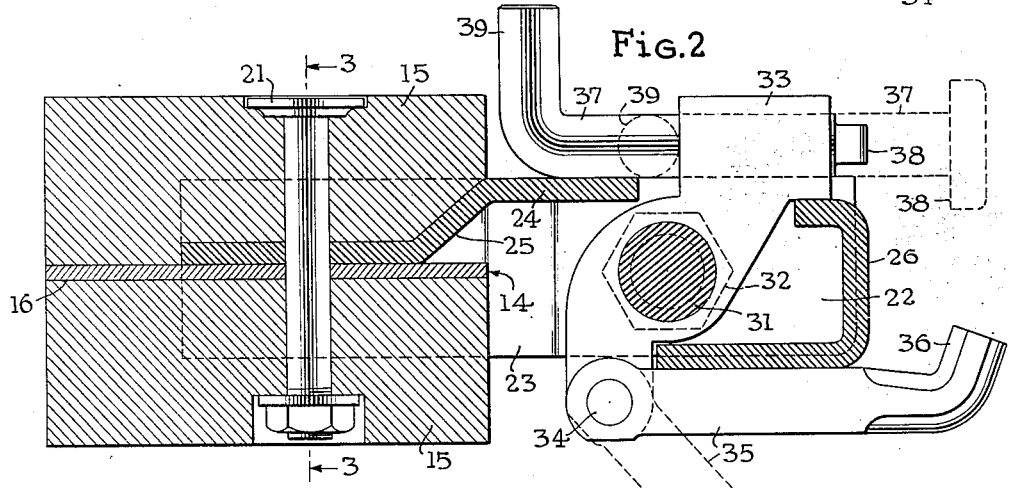
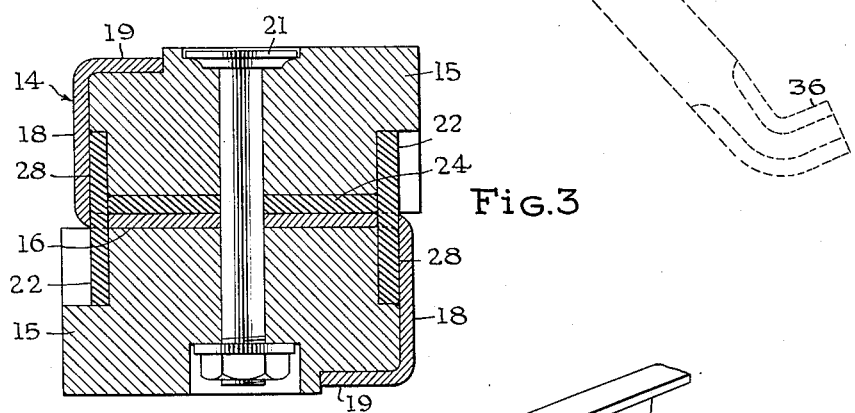
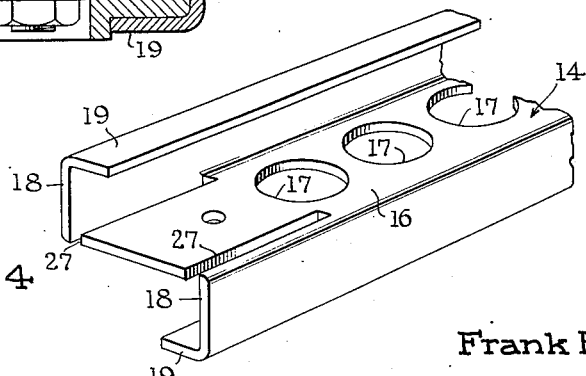
Inventor
Frank Fahland
By Dodge
Attorneys Patented July 4, 1950

2,514,229

UNITED STATES PATENT OFFICE 2,514,229

SUPPORTING CROSSBAR FOR VEHICLES

Frank Fahland, Omaha, Nebr.

Original application April 23, 1945, Serial No. 589,729, now Patent No. 2,476,362, dated July 19, 1949. Divided and this application May 19, 1949, Serial No. 94,160

5 Claims. (Cl. 105—369)

This invention relates to load-supporting and load-bracing elements for use in transport vehicles such as ships, freight cars, trucks and the like. As a convenient way of explaining the invention it will be described as embodied for use in freight cars of the box car type.

The present application is a division of my co-pending application Serial No. 589,729 filed April 23, 1945. The application aforesaid issued after the filing of the divisional application as No. 2,476,362, July 19, 1949.

It is known practice to provide box cars with steel linings spaced from the car wall and provided with spaced perforations. These receive locking fixtures mounted on the ends of crossbars used to support or confine crated or other articles shipped in the car.

The invention relates to such crossbars and the novelty claimed in the present divisional application resides in features which improve the beam strength of such crossbars. Particular means for attaching each end of such a bar to the perforated lining of the car, and for adjusting each end of the crossbar in transverse directions, form the subject matter of the parent application, and consequently are not claimed herein.

Some cars have apertured posts (either fixed or adjustable) in lieu of the perforated lining above mentioned. The invention claimed herein can be adapted to use with such posts, the problem being basically the same. Indeed the invention can be used wherever it is desired to connect the ends of a beam releasably to parallel supports, and it can be used within fittings of types specifically different from those shown and claimed in the parent application.

A preferred embodiment of the invention will now be described by reference to the accompanying drawings in which:

Fig. 1 is a side elevation of a complete beam with the middle portion broken out to reduce the length of the view.

Fig. 2 is a vertical longitudinal medial section of the right-hand end portion of the beam shown in Fig. 1.

Fig. 3 is a section on the line 3—3 of Fig. 2.

Fig. 4 is a perspective view of the steel component of the beam hereinafter called the "shell."

Perforated walls for freight cars are standardized to a considerable extent, and a typical perforated lining plate is illustrated in Fig. 6 of the parent application. It is also illustrated in Fig. 1 of the patent to Hebert No. 2,268,394 dated December 30, 1941. Generally stated the perforations, which are alined in horizontal and vertical rows, comprise a circular center with diametrically opposite horizontal rectangular extensions. This point is mentioned because the connecting members illustrated in the drawings of the present application are designed for use with a perforated wall of the type mentioned.

The beam proper is composite and comprises a pressed steel shell 14 which is generally S-shaped in cross section and two wooden inserts 15. The central web 16 of the shell 14 is at the neutral axis of the composite beam and hence can be lightened by a row of perforations 17 without appreciable loss of strength. Projecting oppositely from the extreme edges of the web 16 are flanges 18 having rims 19. It should be observed that the rims 19 are relatively narrow. Since they are quite remote from the neutral axis of the composite beam, they will develop sufficient strength even though small in dimension. This circumstance contributes to light weight. The rims 19 are sunk into rebates cut in the wooden inserts 15 so that the wooden inserts form the load-contacting surfaces of the beam on all four sides thereof. Through bolts 21 (see Figs. 2 and 3) clamp the inserts 15 to the shell 14, i. e. against the web 16. The head and the nut on each of the bolts 21 are countersunk as best shown in Fig. 3. They, too, are located along the neutral axis so that the holes formed in web 16 for their passage do not materially weaken the composite beam.

As best shown in Fig. 3 the general configuration of the beam is rectangular and indeed nearly square but on every face the wooden insert stands proud of the metal shell so that a wooden contact face is afforded to engage the lading no matter in what direction the beam is loaded.

A beam so constructed can be used with end housings of various designs but I prefer and shall here describe the type disclosed and claimed in the parent application.

The end housings are conveniently constructed of plate by welding pressed or forged sections. The components welded together are two side plates 22 offset toward each other at 23, an interposed connecting web 24, with offset 25, and a J-shaped tie member 26 which is set between the side plates 22 and connects the extreme ends thereof (see Fig. 2).

The end housings are welded to shell 14. The side plates 22 enter slots 27 in web 16 and engage the inner faces of the respective flanges 18 to which they are welded at 28 (see Figs. 2, 3 and 4). The web 24 engages web 16 and is welded thereto. Thus the end housings are virtually integral with the shell 14 of the composite beam. The wooden inserts 15 are clamped to the shell and stiffen the same but offer comparatively little direct support to the end housings (see Fig. 2).

The vertical dimension of side plates 22 is materially less than the depth of the beam (see Fig. 2) and the horizontal dimension between the outer faces of plates 22 is considerably less than the width of the beam because of the presence of offsets 23.

The plates 22, between members 24 and 26 have alined apertures in which journals at the ends of a heavy screw 31 are rotatable. Hexagonal nuts 32 are welded to the projecting ends of the journals and form means by which the screws 31 can be turned. The screw is thus swiveled in the end housing.

Threaded on each screw 31 is a block or carriage 33 whose form is clearly shown in Fig. 2. The carriage is held against rotation by engagement with a portion of the cross member 26.

Hinged to each block 33 on the horizontal pin 34 is a locking arm 35. This has a hooked end 36 of a cross section designed to fit any of the holes in the perforated wall of the car. Slidable longitudinally in a guide formed in the upper part of block 33 is a bolt 37 with a crossbar 38 at its end, the block being so dimensioned that it and the end of the bolt will pass through a second hole in the perforated wall of the car. When the bolt is turned on its axis, the crossbar 38 engages behind the plate forming the car wall. A laterally extending handle 39 is provided for convenience in turning and thus locking the bolt.

There are identical fittings at the two ends of the beam as indicated in Fig. 1.

It will be observed that the nuts 32, bolts 37 (when locked) and arm 35 (when engaged) are all between the planes defined by the two side surfaces and the top and bottom surfaces of the beam. The possible transverse travel of block 33 is more than half the interval center to center between holes in the standardized perforated wall of the car.

*Operation*

In placing the beam it is held with its ends slightly above the desired position and the arms 35 are swung up so that the ends 36 start into appropriate holes in the perforated wall of the car. The beam is then lowered until arms 35 engage cross-member 26, whereupon the bolts 37 are protruded and turned 90°. They enter the holes next above those entered by the arms 35. The screws 31 may then be turned to advance the beam into engagement with the lading.

The beam locks at its end to the plates so as to be held against relative motion in any direction. The beam may thus be placed above an object and act to hold it down. The screws afford progressive horizontal adjustment of such extent relatively to the spacing of the supporting perforations that precise setting of the beam may always be had. If needed, a second beam may be set behind and forced against the first to reinforce it.

The construction of the composite beam is an important feature. The S-shaped shell 14 is of pressed steel and of such form that the metal is effective to the fullest extent, providing a beam with the maximum practicable section modulus in both transverse directions.

With the beam positioned as described the flanges 18 give strength to resist buffing stresses or other forces acting in a horizontal direction. Similarly the rims 19 give strength to resist vertical loads. The perforations 17 in the web 16 reduce weight without appreciably impairing strength because they are substantially at the neutral axis for either direction of loading.

The wooden inserts bearing against flanges 18 and under rims 19 and being bolted together through the web 16 at intervals throughout the length of the beam, as indicated at 21 in Fig. 1, are effective as load-bearing components of the composite beam. Not only do they resist bending moments imposed on the composite beam, but also they resist compression and torsional stresses and resulting deformation such as might otherwise occur in the thin steel section of the S-shaped shell 14.

In addition to the above structural aspects the wooden inserts are the load-contacting portions of the beam.

Since the end housings are welded to the core, a durable and very rigid structure results.

The advantages of the particular composite beam above described are substantial. The narrow rims 19 afford great strength with very moderate weight and weight is further reduced by the holes 17 located along the neutral axis where their presence does not impair strength in any significant degree. The wooden inserts reinforce the beam to some extent but their most important function arises from the fact that they stand proud of the metal shell and so afford wooden contact surfaces. It should be observed that no matter how the beam is loaded the wooden inserts are forced directly against the metal shell. Thus, the stresses developed are not transmitted through the bolts. As a consequence the beam is convenient to use and, weight for weight, develops virtually the maximum attainable strength. Such beams have to be placed by hand. Light weight combined with strength is a matter of the utmost importance.

While the end fittings described in this application are believed to be particularly desirable, the structural aspects of the beam proper can be availed of with other fittings, many of which are known in the art.

I claim:

1. A light-weight composite beam-unit adapted to resist transverse loading in any direction, and comprising in combination, a metal shell of a length approximating that of the beam-unit, generally S-shaped in cross section, and having a web slightly narrower than the transverse dimension of the composite beam-unit with marginal reversely-turned lateral flanges, each slightly less in width than half the transverse dimension of the composite beam-unit, each flange having an inturned rim of a width less than the width of the flange; attaching means permanently connected with the opposite ends of said shell; and non-metallic filling pieces approximately coextensive in length with said shell, fixed against the opposite faces of said web, said filling pieces standing proud of said shell throughout substantially their lengths and in directions transverse to the beam and each filling one of the channels formed between the web and a respective rim, the cross sections of said filling pieces being such that the transverse section of the composite beam-unit is approximately rectangular.

2. The combination defined in claim 1 in which the filling pieces stand proud of the shell on all four faces of the composite beam-unit, and are substantially rectangular in cross-section except for a longitudinally extending rebate also substantially rectangular in cross-section, said rebate being of a width to receive the corresponding rim and of a depth which exceeds the thickness of said rim.

3. The combination defined in claim 1 in which the web is formed with a row of closely spaced apertures extending along its median line.

4. The combination defined in claim 1 in which the web is formed with a row of closely spaced apertures extending along its median line and bolts pass through both filling pieces and through certain of said apertures in the web and serve to clamp the filling pieces against said web.

5. The combination defined in claim 1 in which the composite beam-unit is approximately square in cross section and the shell is provided with a row of closely spaced perforations which extend down the median line of the web and are located at the neutral axis of the beam-unit for any direction of loading.

FRANK FAHLAND.

REFERENCES CITED

The following references are of record in the file of this patent:

UNITED STATES PATENTS

| Number | Name | Date |
|---|---|---|
| 1,909,243 | Adamy | May 16, 1933 |
| 2,085,923 | Murphy | July 6, 1937 |
| 2,476,362 | Fahland | July 19, 1949 |
| 2,497,683 | Nampa et al. | Feb. 14, 1950 |